United States Patent
Kosugi et al.

[11] Patent Number: 5,432,659
[45] Date of Patent: Jul. 11, 1995

[54] MAGNETIC DISK UNIT HAVING A PLURALITY OF MAGNETIC HEADS

[75] Inventors: Tatsuhiko Kosugi; Shuichi Hashimoto, both of Kawasaki, Japan

[73] Assignee: Fujitsu Limited, Kawasaki, Japan

[21] Appl. No.: 23,806

[22] Filed: Feb. 25, 1993

[51] Int. Cl.6 .................. G11B 5/596; G11B 15/14
[52] U.S. Cl. ................ 360/77.02; 360/77.04; 360/69; 360/64
[58] Field of Search ............. 360/77.02, 75, 69, 64, 360/77.04

[56] References Cited

U.S. PATENT DOCUMENTS 4,525,756 6/1985 Takai et al. .................. 360/75

FOREIGN PATENT DOCUMENTS

| 0384833 | 2/1990 | European Pat. Off. |
| 58-200471 | 11/1983 | Japan . |
| 1-208707 | 8/1989 | Japan . |
| 2-244467 | 9/1990 | Japan . |
| 3-30157 | 2/1991 | Japan . |
| 3-113783 | 5/1991 | Japan . |

*Primary Examiner*—W. R. Young
*Assistant Examiner*—Varsha A. Rapadia
*Attorney, Agent, or Firm*—Greer, Burns & Crain, Ltd.

[57] ABSTRACT

In a magnetic disk unit, a magnetic head to be activated is switched from a first magnetic head to a second magnetic head in accordance with an instruction supplied from a host system in a state where a plurality of magnetic heads are positioned at a cylinder on magnetic disks. The magnetic disk unit includes a digital servo controller for monitoring at predetermined intervals whether or not the instruction for the changing of the magnetic head is supplied from the host system, a first output circuit for outputting a first signal for a predetermined time from a time at which the digital servo controller recognizes that the instruction for the changing of the magnetic head is supplied from the host system, and a second output circuit for outputting a second signal at least from a time at which the instruction for the changing of the magnetic head is input to the magnetic disk unit to a time at which the digital servo controller recognizes that the instruction is supplied from the host system. The first signal and the second signal indicate that the magnetic disk unit is busy adjusting the plurality of magnetic heads so that an off-track error of the second magnetic head is cancelled.

7 Claims, 6 Drawing Sheets

MAGNETIC DISK UNIT HAVING A PLURALITY OF MAGNETIC HEADS

BACKGROUND OF THE INVENTION

1. Field of the Invention

The present invention generally relates to a magnetic disk unit, and more particularly to a magnetic disk unit in which a magnetic head to be used is selected from a plurality of magnetic heads.

2. Description of Related Art

Recently, in magnetic disk units, to increase the capacity of each magnetic disk, the track pitch which is the distance between adjacent tracks on each magnetic disk has been decreased. The magnetic disk unit has a plurality of magnetic heads mounted at ends of arms of a head actuator so as to face respective magnetic disks. The head actuator drives the magnetic heads so that all the magnetic heads are positioned at a cylinder in the magnetic disks. In this magnetic disk unit, due to temperature variations, each magnetic head may be misaligned with a track, in the cylinder, at which each magnetic head is to be positioned on a corresponding magnetic disk. This is referred to as a thermal off-track error. The smaller the pitch on the magnetic disk, the more greatly the thermal off-track error affects read/write operations in the magnetic disk unit.

During a seek operation of a positioning circuit in accordance with a seek instruction from a host system, the magnetic heads are positioned at a cylinder in the magnetic disks. In a case where the track pitch is large enough to ignore the thermal off-track error of each magnetic head, all the magnetic heads can be positioned at tracks in the same cylinder. In this case, immediately after a magnetic head by which data is to be read or written is switched in accordance with a head switching instruction from the host system, the data can be read from or written in a corresponding track in the cylinder at which the magnetic heads are positioned. The positioning circuit activates a track follow signal (TRK-FLW) indicating the allowance of the read/write operation after the seek operation. In the above case, even if the magnetic head by which the data is to be read or written is switched off, the track follow signal (TRK-FLW) is maintained to be activated. When the track follow signal (TRK-FLW) output from the positioning circuit is activated, the host system can at any time supply a read/write instruction to the magnetic disk unit.

On the other hand, in a case where the track pitch is small so that the thermal off-track error of each magnetic head cannot be ignored, all the magnetic heads are not always positioned at tracks in the same cylinder. Thus, when the magnetic head is switched from a first head to a second head in accordance with the head switching instruction supplied from the host system after the seek operation is completed so that the first head is positioned at a corresponding track in a cylinder, a thermal off-track error of the second head must be compensated for. That is, to compensate for the thermal off-track error of the second head, all the magnetic heads are moved so that the second head is precisely positioned at a corresponding track in the cylinder. In this case, the track follow signal (TRK-FLW) is deactivated until the compensation for the thermal off-track error is completed.

The positioning circuit outputting the track follow signal (TRK-FLW) is generally formed of a digital servo-controller (MPU). The digital servo-controller monitors whether or not the head switching instruction (SW INSTRUCTION) is supplied from the host system at a predetermined intervals (e.g. 10 $\mu$sec.) in synchronism with a sampling clock signal as shown in FIG. 1. Thus, the track follow signal (TRK-FLW) is not always inactivated immediately after the head switching instruction is supplied from the host system. When the track follow signal (TRK-FLW) signal is deactivated at a time t1 after a time t0 at which the head switching instruction is supplied from the host system, the read/write operation is allowed between t0 and t1, as shown in FIG. 1, although the compensation of the thermal off-track error is not completed. Thus, in this case, original data may be erased from a track adjacent to a track in which data is to be written by overwriting of data.

SUMMARY OF THE INVENTION

Accordingly, a general object of the present invention is to provide a novel and useful magnetic disk unit in which the disadvantages of the aforementioned prior art are eliminated.

A more specific object of the present invention is to provided a magnetic disk unit in which a track follow signal can be deactivated immediately after the head switching instruction is supplied from the host system.

The above objects of the present invention are achieved by a magnetic disk unit in which an activated magnetic head is switched from a first magnetic head to a second magnetic head in accordance with an instruction supplied from a host system in a state where a plurality of magnetic heads are positioned at a cylinder of magnetic disks, the magnetic disk unit comprising: monitor means for monitoring at predetermined intervals whether or not the instruction for the switching from the first magnetic head to the second magnetic head is supplied from the host system; first output means for outputting a first signal for a predetermined time beginning from a time at which the monitor means recognizes that the instruction for the switching of the magnetic head is supplied from the host system; and second output means for outputting a second said second signal being outputted at least for a time beginning from a time at which the instruction for the changing of the magnetic head is input to the magnetic disk unit to a time at which the monitor means recognizes that the instruction is supplied from the host system, wherein the first signal and the second signal indicate that the magnetic disk unit is busy adjusting the plurality of magnetic heads to cancel an off-track error for the second magnetic head and deactivate reading and writing operations while said magnetic disk unit is busy.

According to the present invention, the second signal is output for a predetermined time from a time at which the monitor means recognizes that the instruction is supplied from the host system, and the second signal and the first signal indicate that the magnetic disk unit is busy adjusting the plurality of magnetic heads to cancel an off-track error for the second magnetic head. Thus, a track follow signal can be deactivated (the second signal is output) immediately after the head switching instruction is supplied from the host system. As a result, when the magnetic head is switched to a new one, the read/write operation is not performed before the new magnetic head adjusted to cancel the off-track error. That is, the new magnetic head is prevented from overwriting data in a track next to the track identified by the track number in error.

Additional objects, features and advantages of the present invention will become apparent from the following detailed description when read in conjunction with the accompanying drawings.

DESCRIPTION OF THE PREFERRED EMBODIMENTS

A description will now be given of an embodiment of the present invention.

Figure 1:
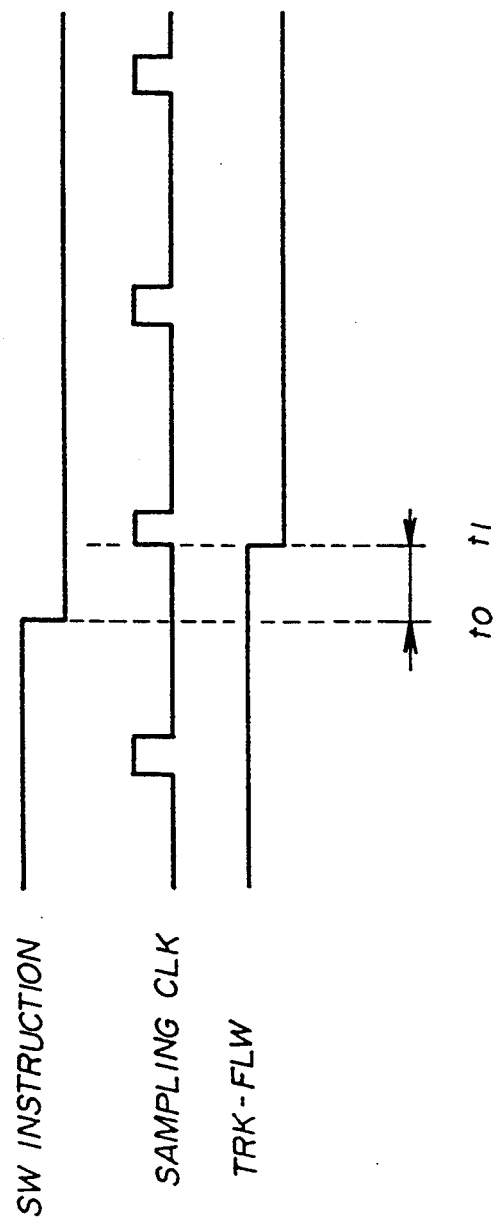
FIG. 1 is a timing chart illustrating a head switching instruction, a sampling signal and a track follow signal according to the prior art.
Figure 2:
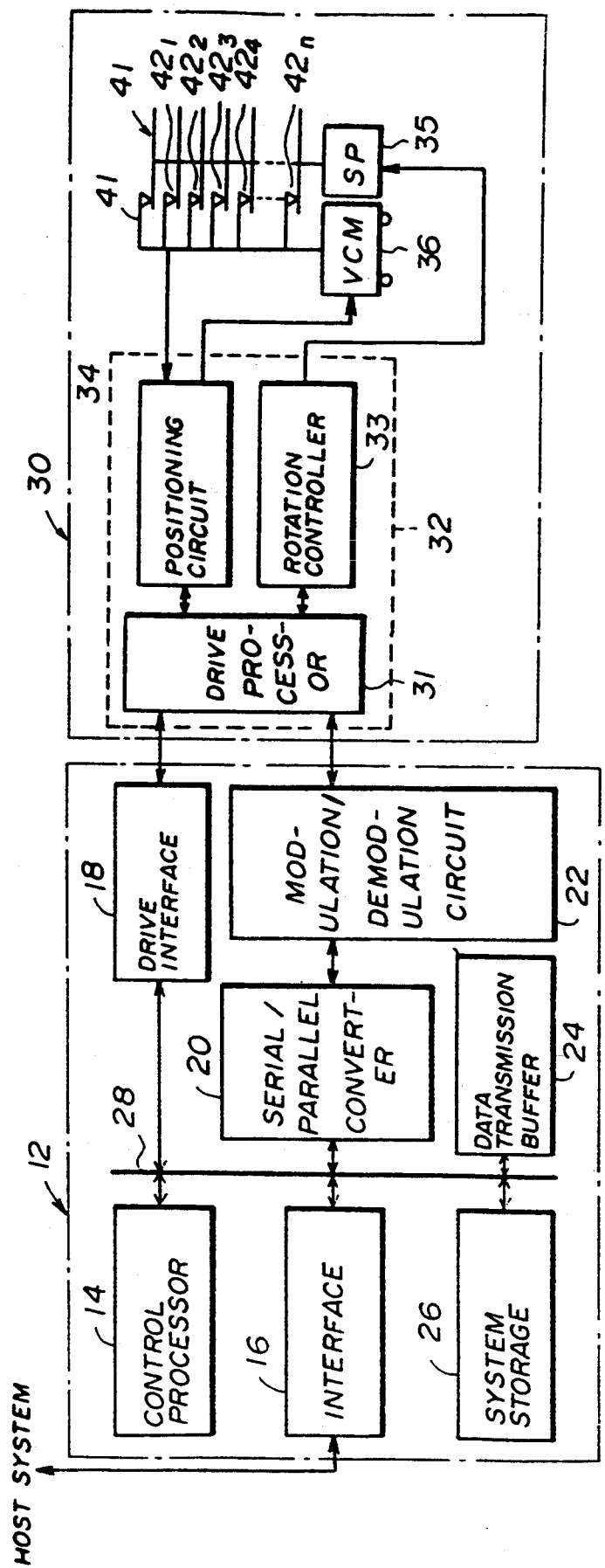
FIG. 2 is a block diagram illustrating a magnetic disk unit according to an embodiment of the present invention.

A magnetic disk unit is formed of a disk controller 12 and a disk driver unit 30, as shown in FIG. 2. Referring to FIG. 2, the disk controller 12 has a control processor 14, an interface 16, a drive interface 18, a serial/parallel converter 20, a data transmission buffer 24 and a system storage unit 26. The interface 16, the drive interface 18, the serial/parallel converter 20, the data transmission buffer 24 and the system storage unit 26 are connected to the control processor 14 via an internal bus 28 so as to be collectively controlled by the control processor 14. A host system is coupled to the internal bus 28 via the interface 16. The disk driver unit 30 is coupled to the internal bus 28 via the drive interface 18 so that control commands from the control processor 14 are transmitted to the disk drive unit 30 via the internal bus 28 and the drive interface 18. Read data and write data are transmitted between the serial/parallel converter 20 and the disk driver unit 30 via a data modulation/demodulation circuit 22. The write data and the read data are temporarily stored in the data transmission buffer 24, and are respectively transmitted to the disk driver unit 30 and the host system.

The disk driver unit 30 is provided with a driver circuit 32. The driver circuit 30 is formed of a drive processor 31, a rotation controller 33 and a positioning circuit 34. Control commands from the disk controller 12 are supplied to the rotation controller 33 and the positioning circuit via the drive processor 31. The rotation controller 33 drives a spindle motor 35 so that a plurality of magnetic disks 40 mounted on a shaft of the spindle motor (SP) 35 are concentrically rotated at a constant speed. The positioning circuit 34 drives a voice coil motor (VCM) 36. The voice coil motor 36 rotates a head actuator having arms on which magnetic heads 41 and $42_1$ through $42_n$ are mounted at ends thereof. Each of the magnetic heads 41 and $42_1$ through $42_n$ faces a corresponding magnetic disk 40. Due to the rotation of the head actuator, the magnetic heads 41 and $42_1$ through $42_n$ move in an approximately radial direction of the magnetic disks 40. The magnetic head 41 positioned above the magnetic heads 41 and $42_1$ through $42_n$ is used as a servo head. The remaining heads $42_1$ through $42_n$ are used as data heads. The magnetic head 41 is referred to as the servo head 41 and the remaining magnetic heads $42_1$ through $42_n$ are referred to as data heads $42_1$ through $42_n$. A magnetic disk facing the servo head 41 is referred to as a servo disk and magnetic disks facing the data heads $42_1$ through $42_n$ are referred to as data disks. Servo information is recorded on all cylinders (tracks) of the servo disk.

Figure 3:
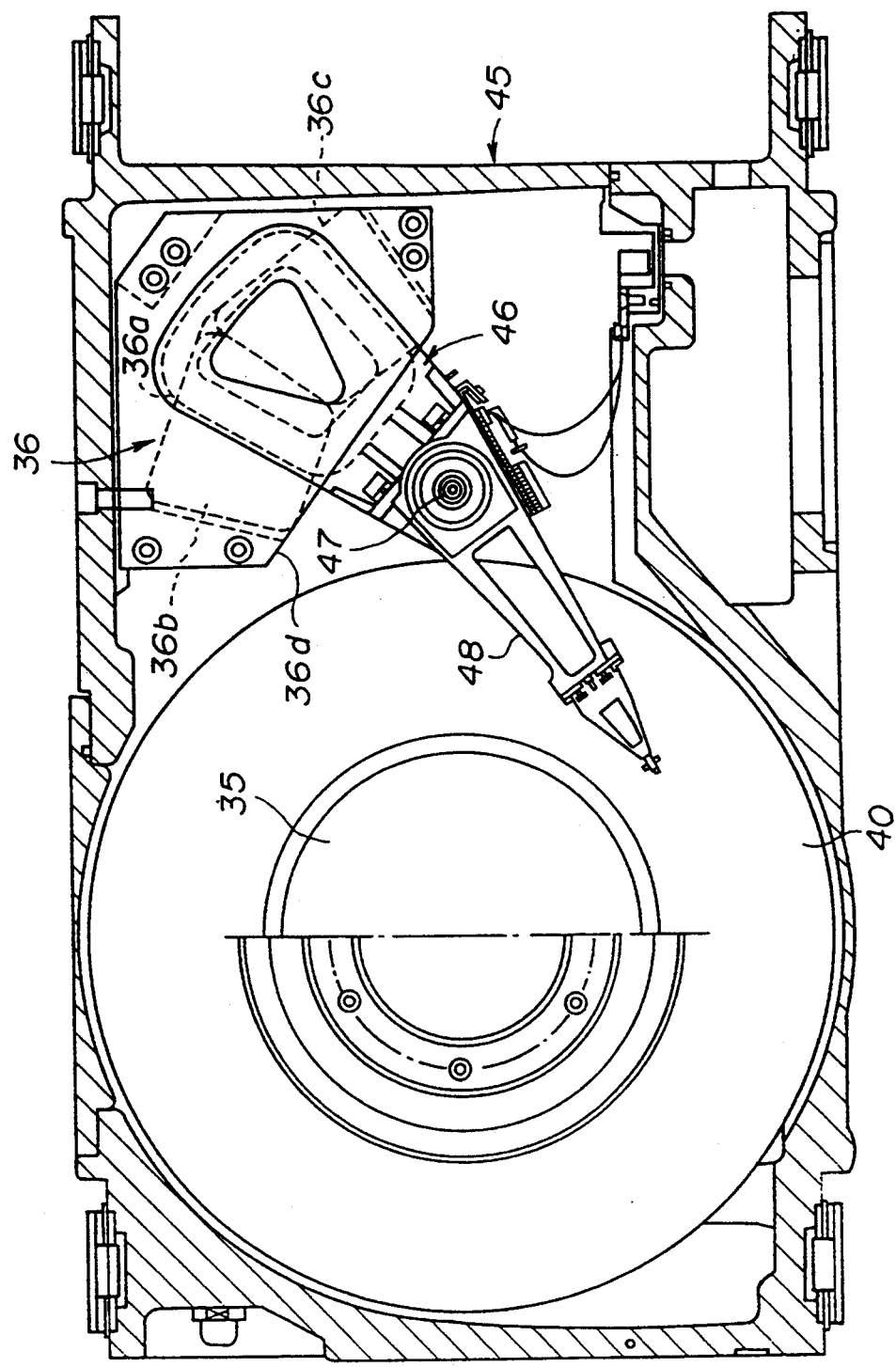
FIGS. 3 and 4 are diagrams illustrating a structure of a disk enclosure (DE) including a mechanism for concentrically rotating a plurality of magnetic disks and for moving a plurality of magnetic heads.
Figure 4:
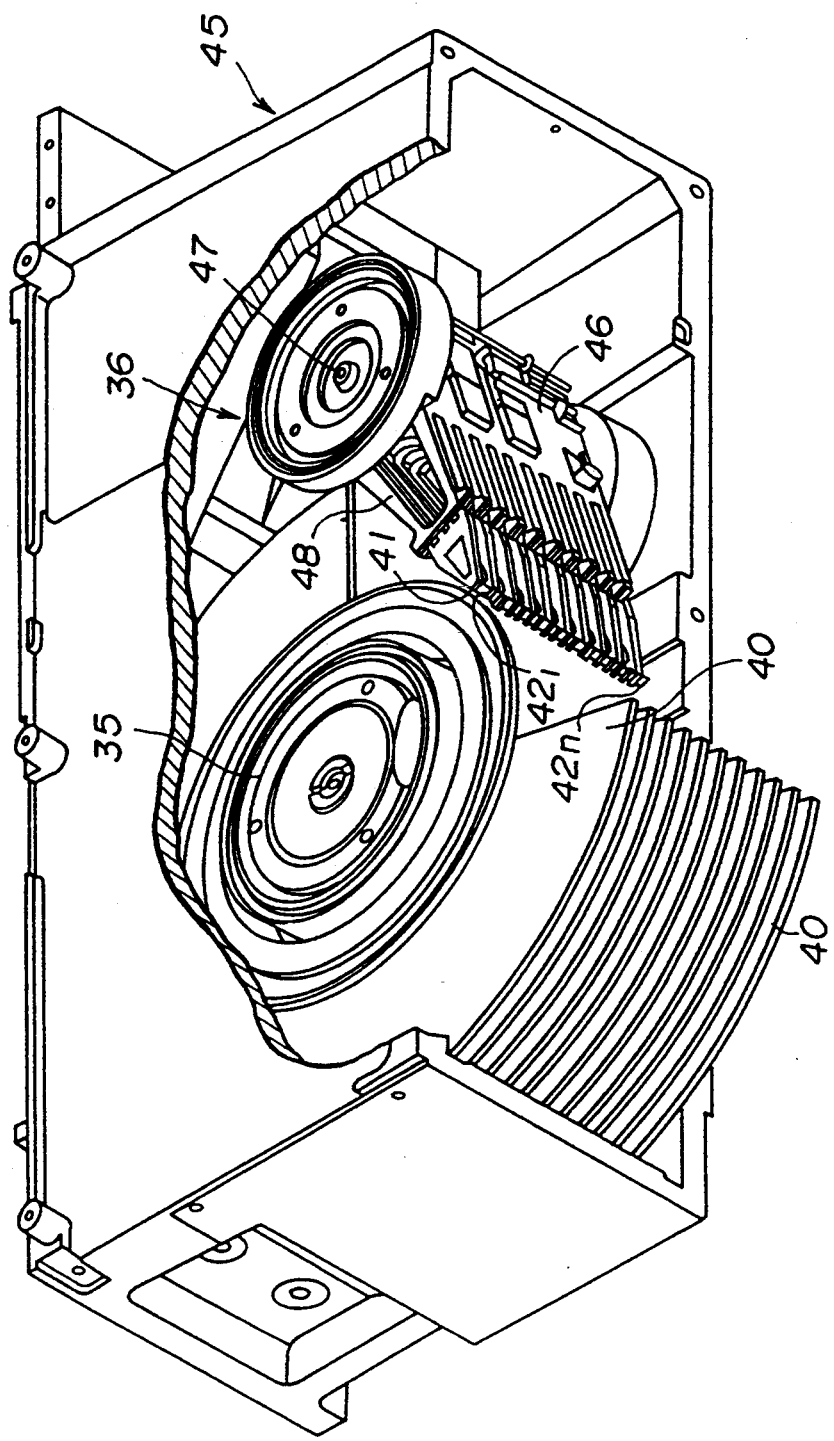

The magnetic disks 40, the servo head 41, the data heads $42_1$ though $42_n$, the spindle motor 35 and the voice coil motor 36 are housed in a disk enclosure 45 as shown in FIGS. 3 and 4.

Referring to FIGS. 3 and 4, eleven magnetic disks (one servo disk and ten data disks) are housed in the disk enclosure 45. The eleven magnetic disks 40 are mounted on the spindle motor 35 so as to be at predetermined intervals, and are concentrically rotated by the spindle motor 35. A head actuator 46 is pivoted around a shaft 47 by the voice coil motor 36. Due to the pivoting of the head actuator 46, the magnetic heads 41 and $42_1$ through $42_n$ (n=10) which are mounted on ends of arms 48 of the head actuator 46 are moved in an approximately radial direction of the magnetic disks 40. In FIG. 3, the voice coil motor 36 is formed of a coil 36a, magnets 36b and 36c and a yoke 36d.

Figure 5:
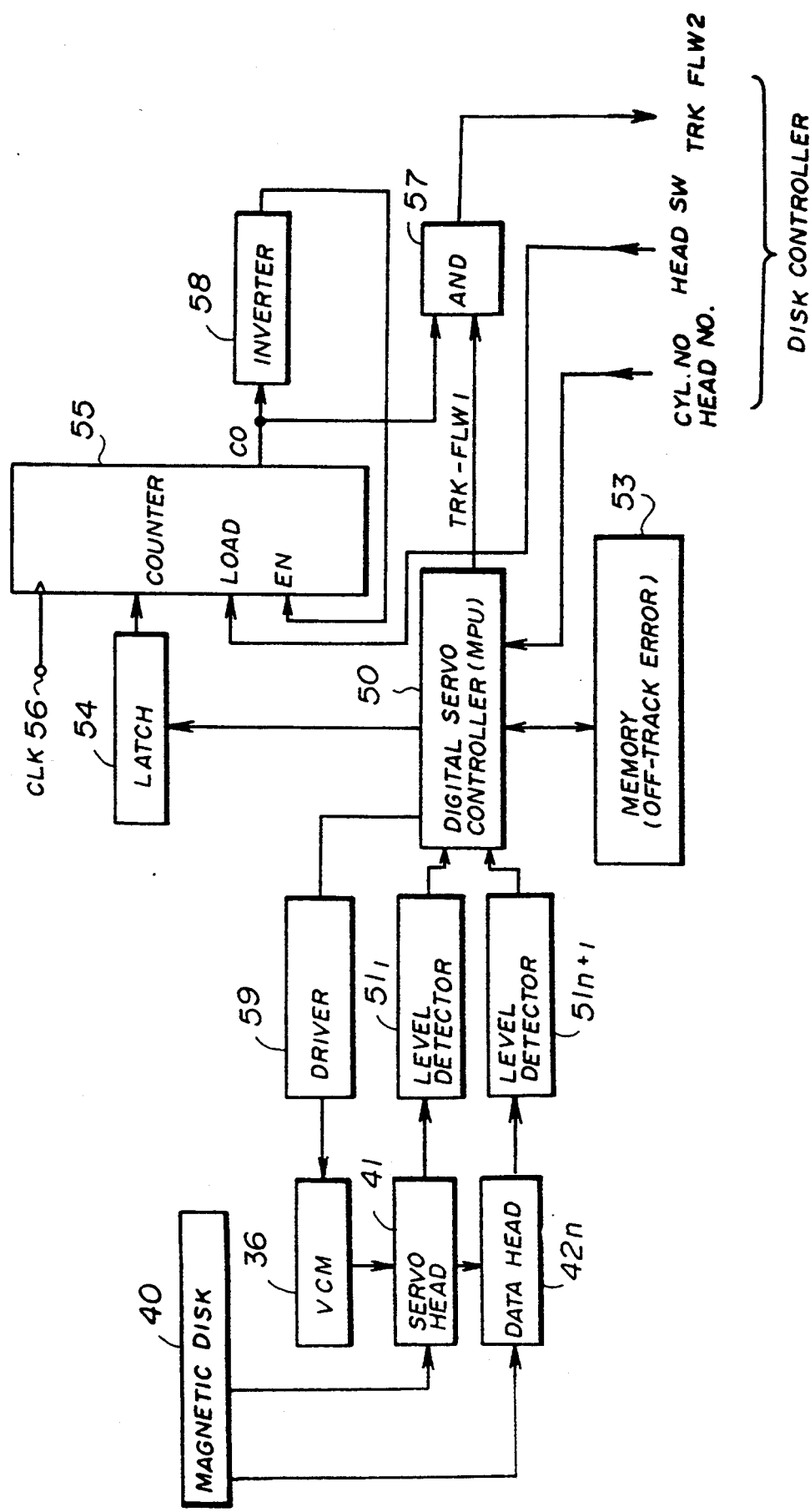
FIG. 5 is a block diagram illustrating a detailed structure of a positioning circuit shown in FIG. 2.

The positioning circuit 34 shown in FIG. 2 is formed as shown in FIG. 5.

Referring to FIG. 5, the positioning circuit 34 has a digital servo controller (MPU) 50, level detectors $51_1$ through $51_{n+1}$ (n=10), a memory 53, a latch circuit 54, a counter 55, an AND gate 57, an inverter 58 and a driver 59. The servo head 41 and the data heads $42_1$ through $42_n$ are connected to the level detectors $51_1$ through $51_{n+1}$ (n=10), and levels of signals produced by the servo head 41 and the data heads $42_1$ through $42_n$ are supplied, as digital data, from the level detectors $51_1$ through $51_{n+1}$ to the digital servo controller 50. The driver 59 drives the voice coil motor 36 in accordance with driving control signals supplied from the digital servo controller 50. The memory 53 may store an off-track error value for each magnetic head. The counter 55 performs a counting operation in synchronism with a clock signal input to a clock terminal 56. An initial value supplied from the digital servo controller 50 is temporarily latched in the latch circuit 54. The initial value latched in the latch circuit 54 is loaded in the counter 55 when a load terminal (LOAD) is provided with an active pulse. The counter 55 is an 8-bit counter. Thus, when the count value of the counter 55 reaches $FF_H$ (H means a hexadecimal number), a carry out signal (CO) from the counter 55 is activated. The carry out signal (CO) is supplied to the inverter 58, and the output of the inverter is supplied to an enable terminal (EN) of the counter 55. Thus, the counter 55 continuously performs the counting operation until the carry out signal (CO) is activated. The host system activates a head switching signal (HEAD SW) and outputs a switching instruction (SW INSTRUCTION) when the magnetic head to be activated is switched from one to another. The head switching signal (HEAD SW) is supplied from the disk controller 12 to the load terminal (LOAD) of the counter 55 in accordance with instructions from the host system. A cylinder number identifying a cylinder to be accessed and a head number identifying a magnetic head to be activated are supplied from the disk controller 12 to the digital servo controller 50 in accordance with instructions from the host system.

The digital servo controller 50 monitors, in synchronism with a predetermined clock signal (not shown), whether or not the switching instruction (SW INSTRUCTION) is output from the host system. When the digital servo controller 50 recognizes that the switching instruction (SW INSTRUCTION) is supplied from the host system, the digital servo controller 50 deactivates a first track follow signal (TRK-FLW 1), in the same manner as in the conventional case. The carry out signal (CO) from the counter 55 and the first track follow signal (TRK-FLW 1) from the digital servo controller 50 are supplied to the AND gate 57. The output signal of the AND gate 57 is supplied, as a second track follow signal (TRK-FLW 2), to the host system via the disk controller 12. The host system outputs the read/write instruction to the magnetic disk unit when the second track follow signal is activated.

The digital servo controller 50 measures off-track errors for the servo head 41 and the data heads $42_1$ through $42_n$ at predetermined intervals (e.g. 5 minutes). Values of the off-track errors for the servo head 41 and the data heads $42_1$ through $42_n$ are stored in the memory 53 and updated every time the off-track errors are measured. In the measurement operation for the off-track errors, the voice coil motor 36 is driven so that the servo head 41 and the data heads $42_1$ through $42_n$ are positioned at an off-track cylinder which is a cylinder used for measuring the off-track errors. In this state, the levels of the reproduction signals output from the servo head 41 and the data heads $42_1$ through $42_n$ are detected by the level detectors $51_1$ through $51_{n+1}$. The digital servo controller 50 calculates, based on the levels of the reproduction signals, values of the off-track errors for the servo head 41 and the data heads $42_1$ through $42_n$. In general, the higher the level of the reproduction signal, the smaller the value of the off-track error. The values of the off-track errors calculated by the digital servo controller 50 are written into the memory 53. The off-track error for the servo head 41 is added to or subtracted from the off-track error for each of the data heads $42_1$ through $42_n$ in accordance with the direction of the off-track error for the servo head 41, so that an off-track error relative to the servo head 41 is obtained for each of the data heads $42_1$ through $42_n$.

When the host system outputs a seek instruction along with a cylinder number (CYL. No.) identifying a cylinder at which the magnetic heads are to be positioned and a head number (HEAD No.) identifying a magnetic head to be activated, the voice coil motor 36 is driven (in a seek operation) so that the servo head 41 and the data heads $42_1$ through $42_n$ are positioned at the cylinder identified by the cylinder number (CYL. No.). Furthermore, referring to the off-track error stored in the memory 53 for the magnetic head identified by the head number (HEAD No.), the voice coil motor 36 is driven so that the off-track error is cancelled. After the magnetic head identified by the head number (HEAD NO.) is positioned at the cylinder (the track) identified by the cylinder number (CYL. No.) in a state where the off-track error has been cancelled, the digital servo controller 50 activates the first track follow signal (TRK-FLW 1). As the carry out signal (CO) is maintained at a high level (activated) at this time, the second track follow signal (TRK-FLW 2) output from the AND gate 57 is also activated. In a state where the second track follow signal (TRK-FLW 2) is activated, the host system supplies the read/write instruction and the magnetic disk unit carries out the read/write operation so that information is written in or read out from the track identified by the cylinder number (CYL. No.) via the magnetic head identified by the head number (HEAD No.).

The digital servo controller 50 determines whether or not each of the values of the off-track errors stored in the memory 53 exceeds a reference value. The reference value corresponds to a value of off-track error which is not negligible relative to the track pitch of the magnetic disks 40. When at least one of the values of the off-track errors stored in the memory 53 exceeds the reference value, the digital servo controller 50 sets a first initial value into the latch circuit 54. The first initial value is, for example, $80_H$. On the other hand, when none of the values of the off-track errors stored in the memory 53 exceeds the reference value, the digital servo controller 50 sets a second initial value into the latch circuit 54. The second initial value is, for example, $FF_H$.

Figure 6:
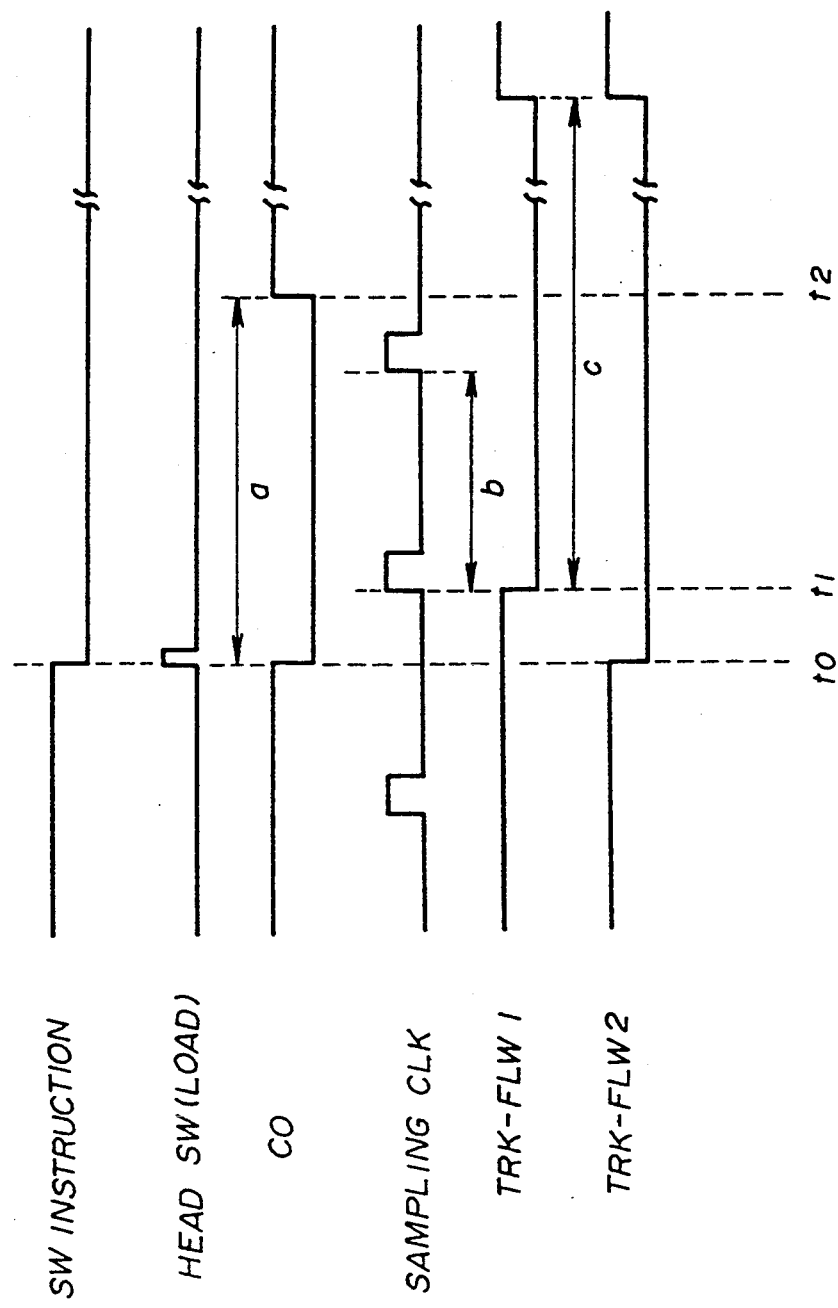
FIG. 6 is a timing chart illustrating various signals in the positioning circuit shown in FIG. 5.

In a case where at least one of the values of the off-track errors exceeds the reference value, the following operation is performed in accordance with the timing chart shown in FIG. 6.

To switch the magnetic head to be activated from one to another in a state where the magnetic heads are positioned at the cylinder identified by the cylinder number (CYL.No.), the host system outputs the switching instruction (SW INSTRUCTION) along with a head number (HEAD No.) identifying a new magnetic head and activates the head switching signal (HEAD SW), at a time $t_o$. When the head switching signal (HEAD SW) supplied to the load terminal of the counter 55 is activated at the time $t_o$, the first initial value (e.g. $80_H$) latched in the latch circuit 54 is set into the counter 55. At this time, the carry out signal (CO) is deactivated (switched to the low level), and the counter 55 starts the counting operation. As the carry out signal (CO) is inactive, the second track follow signal (TRK-FLW 2) output from the AND gate 57 is inactive even if the first track follow signal (TRK-FLW 1) output from the digital is maintained in an active state (the high level). The host system detects that the second track follow signal (TRK-FLW 2) is inactive, so that the host system is inhibited from outputting the read/write instruction. After this, when the digital servo controller 50 recognizes the switching instruction (SW INSTRUCTION) supplied from the host system at a time $t_1$, the digital servo controller 50 deactivates the first track follow signal (TRK-FLW 1). After the digital servo controller 50 deactivates the first track follow signal (TRK-FLW 1), the digital servo controller 50 controls the voice coil motor 36 based on the off-track error data corresponding to the new magnetic head so that the new magnetic head is precisely positioned at the cylinder (the track) identified by the cylinder number (CYL.No.).

When the count value of the counter 55 reaches the maximum value $FF_H$ at a time $t_2$, the carry out signal (CO) is activated (switched to the high level). Thus, at this time ($t_2$), the counter 55 stops the counting operation. After this, when the new magnetic head to be activated is completely positioned at the cylinder (the track), the digital servo controller 50 activates the first track follow signal (TRK-FLW 1). As a result, the second track follow signal (TRK-FLW 2) is activated. When the second track follow signal (TRK-FLW 2) is activated, the host system is allowed outputting the read/write instruction.

In the above embodiment, the first initial value to be set in the counter 55 is decided to a value ($80_H$) so that a time (a) for the count value of the counter 55 to reach the maximum value ($FF_H$) from the initial value is greater than the period (b) of the sampling clock used for detecting whether or not the switching instruction (SW INSTRUCTION) is supplied from the host system. The time (a) for the count value of the counter 55 to reach the maximum value from the initial value is less than a time (c) for which the first track follow signal (TRK-FLW 1) is maintained in the inactive state.

According to the above embodiment, immediately after the switching instruction is output from the host system, the second track follow signal (TRK-FLW 2) is deactivated even if the first track follow signal (TRK-FLW 1) output from the digital servo controller 50 is maintained in the active state. That is, immediately after the magnetic head is switched to a new one, the host system is inhibited from outputting the read/write instruction based on the second track follow signal (TRK-FLW 2). Thus, when the magnetic head is switched to a new one, the read/write operation is not performed before the off-track error of the new magnetic head is compensated for.

Alternatively, in a case where none of the values of the off-track errors exceeds the reference value, the following operation is performed.

When the head switching signal (HEAD SW) supplied to the load terminal of the counter 55 is activated at the time $t_o$, the second initial value (e.g. $FF_H$) latched in the latch circuit 54 is set into the counter 55. As the second initial value (e.g. $FF_H$) is the maximum value, the counter 55 does not start the counting operation. Thus, the carry out signal (CO) is maintained in the active state (the high level). In this case, as the off-track errors for the magnetic heads are small, when the magnetic head is switched to a new one, the off-track error for the new magnetic head does not need to be compensated for. Thus, the digital servo controller 55 maintains the first track follow signal (TRK-FLW 1) in the active state (the high level). As a result, the second track follow signal (TRK-FLW 2) output from the AND gate 57 is maintained in the active state (the high level). Thus, the host system is allowed to output the read/write instruction immediately after outputting the switching instruction for switching the magnetic head to a new one.

In the case where none of the values of the off-track errors exceeds the reference value, the first initial value may be set to the counter 55. In this case, even if the off track-errors are small, the operation as shown in FIG. 6 is performed.

The present invention is not limited to the aforementioned embodiments, and variations and modifications may be made without departing from the scope of the claimed invention.

What is claimed is:

1. A magnetic disk unit in which an activated magnetic head is switched from a first magnetic head to a second magnetic head in accordance with an instruction supplied from a host system in a state where a plurality of magnetic heads are positioned at a cylinder of magnetic disks, said magnetic disk unit comprising:

head adjustment means for adjusting said magnetic heads to cancel off-track errors;

disk control means for controlling reading and writing operations of said magnetic heads;

monitor means for monitoring, at predetermined intervals, whether or not the instruction for the switching from a first magnetic head to a second magnetic head is supplied from said host system;

first output means, connected to said monitor means, for outputting first signals for a predetermined time from a time at which said monitor means recognizes that the instruction for the switching of the magnetic head is supplied from said host system; and second output means, connected to said monitor means, for outputting a second signal, said second signal being outputted at least for a time beginning from a time at which the instruction for the changing of the magnetic head is supplied to said magnetic disk unit to a time at which said monitor means recognizes that the instruction is supplied from said host system, wherein said first signal and said second signal indicate that said magnetic disk unit is busy adjusting said plurality of magnetic heads to cancel an off-track error of said second magnetic head and are supplied to said disk control means and deactivate reading and writing operations while said magnetic disk unit is busy.

2. A magnetic disk unit as claimed in claim 1, wherein:

said second output means outputs said second signal for a time longer than each interval during which said monitor means monitors whether or not the instruction is supplied from said host system.

3. A magnetic disk unit as claimed in claim 1, wherein said second output means comprises:

counter means for performing a counting operation in synchronism with a predetermined externally supplied clock signal, said counter means being activated when the instruction for the changing of the magnetic head is supplied from said host system, said second output means outputting said second signal until a count value of said counter means reaches a predetermined value.

4. A magnetic disk unit as claimed in claim 3, wherein said counter means has a terminal from which a carry out signal is output when the count value of said counter means reaches a maximum count value, and wherein said second output means further comprises initializing means for setting an initial value into said counter means when the instruction is supplied from said host system, said second output means outputting said second signal until said counter means outputs the carry out signal.

5. A magnetic disk unit as claimed in claim 4, wherein the initial value is decided so that a time for which the count value of said counter means reaches the maximum count value is less than each interval during which said monitor means monitors whether or not the instruction is supplied from said host system.

6. A magnetic disk unit as claimed in claim 4, further comprising:

measurement means for measuring off-track errors for said plurality of magnetic heads when said plurality of magnetic heads are positioned at a cylinder of the magnetic disks;

supply means for supplying an initial value less than the maximum count value to said initialization means when at least one of the off-track errors measured by said measurement means is greater than a predetermined value, and for supplying the maximum count value as the initial value to said initialization means when none of the off-track errors measured by said measurement means is greater than the predetermined value.

7. A magnetic disk unit as claimed in claim 1, further comprising:

measurement means for measuring off-track errors for said plurality of magnetic heads when said plurality of magnetic heads are positioned at a cylinder of the magnetic disks;

control means for activating said second output means only when at least one of the off-track errors measured by said measurement is greater than a predetermined value.

* * * * *

UNITED STATES PATENT AND TRADEMARK OFFICE
CERTIFICATE OF CORRECTION

PATENT NO. : 5,432,659
DATED : July 11, 1995
INVENTOR(S) : Kosugi, et al

It is certified that error appears in the above-indentified patent and that said Letters Patent is hereby corrected as shown below:

In the Abstract, line 7, delete "monitoring" insert --monitoring,--.

In the Abstract, line 7, delete "intervals" and insert --intervals,--.

In the Abstract, line 15, delete "signal" and insert --signal,--.

In column 2, line 44, after "second", second occurrence, insert --signal,--.

Signed and Sealed this

Seventeenth Day of October, 1995

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,432,659
DATED : July 11, 1995
INVENTOR(S) : Kosugi et al

It is certified that error appears in the above-indentified patent and that said Letters Patent is hereby corrected as shown below:

On the title page, insert the following:
--[30]  Foreign Application Priority Data
        Mar. 30, 1992  [JD]  Japan .... 4-074447--.

Signed and Sealed this

Fourteenth Day of November, 1995

Attest:

BRUCE LEHMAN

*Attesting Officer*      *Commissioner of Patents and Trademarks*